3,658,823
PROCESS FOR QUINOLINES AND INDOLES (RING CLOSURE OF NITRO COMPOUNDS)
Arthur Gaudens Mohan, West Orange, and Richard Keith Madison, Murray Hill, N.J., assignors to American Cyanamid Company, Stamford, Conn.
No Drawing. Filed July 30, 1969, Ser. No. 846,245
Int. Cl. C07d 33/18
U.S. Cl. 260—283 SY                9 Claims

ABSTRACT OF THE DISCLOSURE

Process for preparing 2-substituted quinolines (I) and 2-acylindoles (II) by reacting carbon monoxide at elevated temperature and superatmospheric pressure in the presence of a co-catalyst composition, of which 5% palladium on carbon with a Lewis acid such as ferric chloride is representative, with an o-nitrostyryl ketone (III):

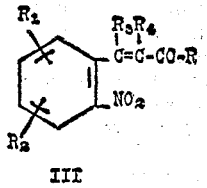

III to form the products (usually in admixture):

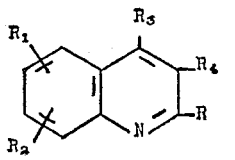 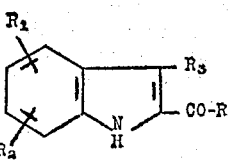

I                II where illustratively, R is alkyl or aryl; and $R_1$, $R_2$, $R_3$ and $R_4$ are hydrogen, alkyl or aryl.

---

This invention relates to a process for preparing quinolines and indoles. More particularly, it relates to a process for preparing 2-substituted quinolines and 2-acylindoles of Formulas I and II, respectively:

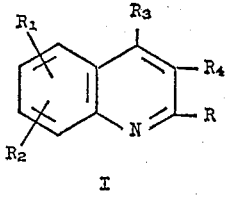 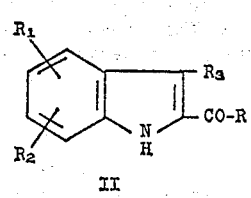

I                II

In Formulas I and II, R is alkyl or aryl; $R_1$ and $R_2$ independently are hydrogen, alkyl, alkoxy, aryl, halogen or, when taken together on adjacent carbon atoms,

—CH=CH—CH=CH— and $R_3$ and $R_4$ independently are hydrogen, alkyl, aryl or, when taken together, —CH=CH—CH=CH—.

Heretofore, 2-substituted quinolines (I) had been made by several procedures, the best known being (1) the Skraup synthesis, wherein an aromatic amine is heated with glycerine, sulfuric acid and an oxidizing agent, and (2) the Doebner-v. Miller synthesis where in an aromatic amine is reacted with an α,β-unsaturated aldehyde. 2-acylindoles of Formula II have been obtained in low yield by the heating of o-nitrostyryl ketones of Formula III below with triethyl phosphite. [J. Org. Chem. 30, 3604 (1965).] They have also been made by reacting indole-2-carboxylic acids with phenyllithium. [Belgian Pat. 637,355; C.A. 62, 7731.] Another route to these "relatively inaccessible" 2-acylindoles recently described involves pyrolysis of the appropriately substituted 6-azido-styrenes [J. Hetero. Chem. 6, 441 (1969)].

It has now been discovered that 2-substituted quinolines of Formula I and 2-acylindoles of Formula II are produced (usually in admixture) when o-nitrostyryl ketones of Formula III below are reacted with carbon monoxide in the presence of a catalyst consisting essentially of a noble metal and a Lewis acid under conditions of superatmospheric pressure and elevated temperature.

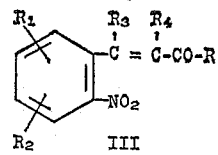

III

In Formula III, R, $R_1$, $R_2$, $R_3$ and $R_4$ are the same as in Formulas I and II.

Compounds of Formula III where $R_3$ and $R_4$ are hydrogen, alkyl or aryl can be obtained by reacting a corresponding o-nitrobenzaldehyde or o-nitronaphthaldehyde with a methyl ketone in the presence of a base according to the procedure of Buza and Polaczkowa, Rocziniki Chem. 39, 545 (1965), C.A. 63, 16237 (1965) for methyl aryl ketones and according to the procedure of Baeyer and Drewsen, Ber. 15, 2856 (1882) [also Can. J. Chem. 37, 502 (1959) and J. Am. Chem. Soc. 73, 4835 (1951)] for methyl alkyl ketones. Improved results are reported for the use of o-nitrobenzylidene diacetate instead of o-nitrobenzaldehyde, Davey and Gwilt, J. Chem. Soc. 1957, 1008. Compounds of Formula III where R is alkyl can also be obtained by nitration of the parent styryl alkyl ketones according to the process of German Pat. 20,255 and J. Am. Chem. Soc. 73, 4835 (1951).

Representative o-nitrobenzaldehydes and o-nitronaphthaldehydes which may be reacted with methyl ketones to provide compounds of Formula III include (all known) o-nitrobenzaldehyde, 5-bromo-2-nitrobenzaldehyde, 5-chloro-2-nitrobenzaldehyde, 4- and 5-fluoro-2-nitrobenzaldehyde, 3-methyl-2-nitrobenzaldehyde, 3,5-dimethyl-2-nitrobenzaldehyde, 3- and 4-methoxy-2-nitrobenzaldehyde, 3,4-dimethoxy-2-nitrobenzaldehyde, 4,5-diethoxy-2-nitrobenzaldehyde, 2-nitro-1-naphthaldehyde, 1-nitro-2-naphthaldehyde, and the like.

Representative methyl ketones which may be reacted with the above aldehydes include (all known) acetone, methyl ethyl ketone, methyl propyl ketone, methyl butyl ketone, methyl hexyl ketone, methyl decyl ketone, benzyl methyl ketone (methylene group reacts), methyl phenyl ketone (i.e., acetophenone), methyl tolyl ketone, methyl p-methoxyphenyl ketone, methyl m-chlorophenyl ketone, methyl naphthyl ketone, and the like.

Representative styryl alkyl ketones which may be nitrated to give compounds of Formula III include (all known) styryl methyl ketone, p-methylstyryl methyl ketone, p-ethoxystyryl methyl ketone, p-propoxystyryl methyl ketone, m-bromostyryl methyl ketone, p-chlorostyryl methyl ketone, p-fluorostyryl methyl ketone, 3,4-dichlorostyryl methyl ketone, α,β-dimethylstyryl methyl ketone, p-methoxy-β-methylstyryl methyl ketone, α-methylstyryl methyl ketone, styryl ethyl ketone, p-methoxystyryl methyl ketone, β-methylstyryl methyl ketone, styryl n-propyl ketone, p-methoxystyryl n-propyl ketone, p-styryl isopropyl ketone, p-chlorostyryl isopropyl ketone, p-methylstyryl isopropyl ketone, styryl tert.-butyl ketone, p-methylstyryl tert.-butyl ketone, and the like.

Representative compounds of Formula III include (all known) o-nitrostyryl methyl ketone, β-methyl-o-nitrostyryl methyl ketone, β-phenyl-o-nitrostyryl methyl ketone, o-nitrostyryl ethyl ketone, o-nitrostyryl phenyl ketone, o-nitrostyryl p - tolyl ketone, o - nitrostyryl 3,4 - dimethoxyphenyl ketone, o-nitrostyryl p-fluorophenyl ketone, etc.

Compounds of Formula III, where $R_3$ and $R_4$ taken together are —CH=CH—CH=CH—, are 2-(o-nitrophenyl)phenyl alkyl or aryl ketones and can be obtained by the reaction of a 2-(o-nitrophenyl)benzoic acid with an alkyl or aryl lithium according to the procedure described in "The Chemistry of the Carbonyl Groups," edited by S. Patai, Interscience, 1966, page 325. They can also be obtained by the reaction of a 2-(o-nitrophenyl)-benzoyl chloride with an alkyl or aryl cadmium as described on pages 304–318 of the same reference. Typical of such ketones is 2-(o-nitrophenyl)phenyl methyl ketone, i.e., 2'-(o-nitrophenyl)acetophenone.

The 2 - (o - nitrophenyl)benzoic acids, such as (all known) 2-(o-nitrophenyl)benzoic acid, 4,5-dimethoxy-2-(o-nitrophenyl)benzoic acid, 4,5-dimethoxy-2-(3-methyl-2-nitrophenyl)-benzoic acid, and the like, can be prepared by the Ullmann reaction between (1) an o-halonitrobenzene or -naphthalene and (2) an ester of an o-halobenzoic acid using the procedures described by Shuttleworth et al., J. Chem. Soc. 1944, 71 and reviewed by Fanta, Chem. Revs. 38, 139 (1946). Representative o-halonitro compounds include (all known) 1 - bromo - 2-nitrobenzene, 1-iodo-2-nitrobenzene, 3-bromo-4-nitrotoluene, 1 - bromo - 4 - ethyl-2-nitrobenzene, 4-bromo-3-nitroanisole, 2-bromo-3-nitronaphthalene, and the like. Representative o-halobenzoic acids include (all known) o-bromobenzoic, o-iodobenzoic acid, o-bromotoluic acid, 2-bromo-4-ethylbenzoic acid, 2-bromo-4,5-dimethylbenzoic acid, 2-bromo-5-ethoxybenzoic acid, 2-bromo-6-phenylbenzoic acid, and the like.

Representative alkyl and aryl lithium compounds for use in preparation of the 2-(o-nitrophenyl) phenyl alkyl or aryl ketones include (all known) methyllithium, ethyllithium, butyllithium, heptyllithium, dodecyllithium, cyclohexyllithium, benzyllithium, phenyllithium, m-, o- and p-tolyllithium, biphenyllithium, 1- and 2-naphthyllithium, and the like. Representative alkyl and aryl cadmium compounds for the same use include (all known) dimethylcadmium, dipropylcadmium, dihexylcadmium, diphenylcadmium, ditolylcadmium, bis(p - methoxyphenyl)cadmium, and the like.

The reaction between the o-nitrostyryl ketone and carbon monoxide may be carried out in an autoclave or any other high pressure reactor. The o-nitrostyryl ketone and catalyst in a solvent, if one is employed, are charged to the reaction vessel, the proper amount of carbon monoxide is added, and the reaction mixture is heated. Sequence of charging is not critical nor are the isolation and purification procedures. Normally, th reaction product mixture is centrifuged or filtered to remove the catalyst, the solvent is evaporated, and the products isolated and purified by crystallization or by vapor phase chromatography.

Suitable pressure for the process will be within the range of about 40 p.s.i.g. to 100,000 p.s.i.g. or higher. The preferred pressure is at least 1,000 p.s.i.g. The reaction proceeds at temperatures of at least 60° C., preferably between at least 150° C. and the temperature of decomposition of the starting material and the product. Reaction time will depend on reaction temperature and pressure and is generally inversely proportional thereto.

A solvent inert to reactants and products is normally employed to facilitate contact of the catalyst and the reactants. Suitable solvents include anhydrous liquids, such as benzene, toluene, xylene, aliphatic halogenated hydrocarbons, such as 1,1,2-trichloro-1,2,2-trifluoroethane; halogenated aromatic hydrocarbons, such as monochlorobenzene, dichlorobenzene and trichlorobenzene; glacial acetic acid, acetonitrile; ethers, such as diethyl ether, dibutyl ether and diphenyl ether; and carboxylic acids, anhydrides or esters, such as acetic acid, acetic anhydride and ethyl acetate; and the like.

The amount of carbon monoxide introduced into the reactor should be sufficient to provide at least three moles of carbon monoxide per nitro group, and preferably is employed in large excess. The required amount of carbon monoxide and the required super-atmospheric pressure are conveniently and preferably provided by pressurizing the reaction vessel with carbon monoxide after introduction of reactants and catalyst.

The catalyst for the reaction of this invention comprises a noble metal and a Lewis acid as defined in the reference book by Jack Hine, "Physical Organic Chemistry," 1962, McGraw-Hill Book Company, New York. The noble metal may be used either in a metallic or a chemically combined state. It may be employed either with or without a physical support. Among the noble metals which may be employed are platinum, palladium, rhodium, osmium, silver, gold, iridium, and mercury. Palladium is preferred. Among the chemical forms of these metals which can be used are the oxides, sulfate, nitrates and halides, as for example: platinum oxide, rhodium oxide, platinum chloride, rhodium chloride, platinum nitrate, platinum sulfate and the corresponding palladium compounds. The noble metals or compounds thereof may be employed singly or in admixture.

The Lewis acid component of the catalyst can be a halide (e.g., an iodine, bromide, chloride or fluoride) of a metal such as tin, titanium, vanadium, molybdenum, gallium, iron, aluminum or copper.

Specific examples of Lewis acids are ferric chloride, ferrous chloride, stannic chloride, stannous chloride, aluminum chloride, titanium tetrachloride, vanadium pentoxide, molybdenum dioxide, aluminum bromide, gallium trichloride, copper tribromide, and cuprous chloride. Additional examples of the salt-type of Lewis acid are listed in the reference book by George A. Olah, "Friedel-Crafts and Related Reactions," vol. I, 1963, Interscience Publishers, New York. Bronsted acid-type of Lewis acids may be used. An example is anhydrous hydrogen chloride. Other Bronsted acids may be used provided they do not react with the starting materials or the products. The preferred Lewis acids are the chlorides of iron and the Lewis acids may be employed singly or in admixture.

The physical form of the catalyst can be varied as desired. The metal can be self-supported or deposited upon a support which disperses the metal so as to increase active surface area. Such porous supports include alumina, silica, carbon, barium sulfate, asbestos, bentonite, diatomaceous earth, and the like.

A preferred co-catalytic system consists of 5% palladium supported on carbon and ferric chloride. Other co-catalyst systems comprise $PdCl_2$ and $AlCl_3$; PdO and $AlCl_3$; Rh and $FeCl_3$; Pd and $FeCl_2$; PtO and $FeCl_3$.

The catalyst is used in an amount effective to form the desired products. This amount depends to some extent on reaction pressure and temperature, sensitivity of the starting materials towards decomposition, and other process conditions. A useful range is from about $10^{-5}$ to 0.1 mol of noble metal and from about $5\times10^{-4}$ to 0.05 mol of Lewis acid per nitrogen atom in the reactant, preferably about 0.02–0.001 mol of Lewis acid and 0.05 to 0.005 mol of noble metal per nitrogen atom.

The following examples are intended as further illustration of the invention but not necessarily as limitation of the scope thereof.

EXAMPLE 1

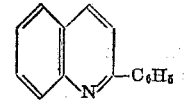

An autoclave is charged with 2.53 g. o-nitrostyryl phenyl ketone, 0.50 g. 5% palladium-on-carbon, 0.20 g.

ferric chloride and 20 ml. anhydrous ethanol, purged with nitrogen, pressurized to 5,000 p.s.i.g. with carbon monoxide and heated at 180–185° C. for 3.5 hours. After removal of the catalyst by filtration, analysis of the residue by vapor phase chromatography shows that no starting material remains and that the product mixture contains about 96% 2-phenylquinoline and about 4% 2-benzoylindole. The solvent is evaporated and a solid material is sublimed from the residue. After recrystallization from aqueous ethanol, the solid melts at 80.5–82.0° C. and is identical to an authentic sample of 2-phenylquinoline by vapor phase chromatography, infrared spectrum and mixed melting point.

When the above procedure is repeated substituting 5% rhodium-on-carbon for the palladium-on-carbon, the same product is obtained.

EXAMPLE 2

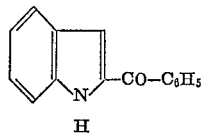

An autoclave is charged with 2.53 g. o-nitrostyryl phenyl ketone, 0.50 g. 5% palladium-on-carbon, 0.05 g. ferric chlorides and 20 ml. cyclohexane, purged with nitrogen, pressurized to 7,500 p.s.i.g. with carbon monoxide and heated at 185–200° C. for 10 hours. After removal of the catalyst by filtration, analysis of the residue by vapor phase chromatography shows that no starting material remains and that the product mixture contains 69% 2-benzoylindole and 31% 2-phenylquinoline. After evaporation of the solvent, extraction of the residue with ether and precipitation of the 2-phenylquinoline with hydrogen chloride, the ether is evaporated and the residue recrystallized from aqueous ethanol. The product, 2-benzoylindole, melts at 148–149° C. and is identical to an authentic sample by vapor phase chromatography, infrared spectrum, and mixed melting point.

When the above general procedure is repeated with substitution of benzene or acetonitrile for the cyclohexane, the relative production of 2-benzoylindole and 2-phenylquinoline is about 60% and 40%, respectively.

EXAMPLE 3

When the procedure of Example 2 is followed with substitution of o-nitrostyryl methyl ketone for the o-nitrostyryl phenyl ketone, 2-methylquinoline and 2-acetylindole are obtained.

EXAMPLE 4

When the procedure of Example 1 is followed with substitution of β-methy-o-nitrostyryl methyl ketone for the o-nitrostyrylphenyl ketone, 2,3-dimethylquinoline is obtained.

EXAMPLE 5

When the procedure of Example 2 is followed with substitution of o-nitrostyryl p-tolyl ketone for thhe o-nitrostyryl phenyl ketone, 2-p-tolylquinoline and 2-p-toluoylindole are obtained.

EXAMPLE 6

When the procedure of Example 2 is followed substituting o-nitrostyryl ethyl ketone for the o-nitrostyryl phenyl ketone, 2-ethylquinoline and 2-propionylindole are obtained.

EXAMPLE 7

When the procedure of Example 2 is followed with substitution of 4-methyl-2-nitrostyryl methyl ketone (obtained by nitration of p-methylstyryl methyl ketone) for the o-nitrostyryl phenyl ketone, 2,7-dimethylquinoline and 2-acetyl-6-methylindole are obtained.

The products of this invention have a wide variety of uses and may be employed therein in known or obvious ways. For example, 2-substituted quinolines of Formula I are herbicidal agents (U.S. Pat. 2,665,203) and 2-acylindoles of Formula II are used in the synthesis of phenylindolylalkanolamine sedatives (Belgium Pat. 637,355). Other fields of use include direct or derivative use as dyes and pharmaceuticals (the 2-substituted quinolines) and as dyes, alkaloids, plant hormones and proteins (the 2-acylindoles).

What is claimed is:

1. A process which comprises reacting at elevated temperature and superatmospheric pressure a nitro compound of the formula

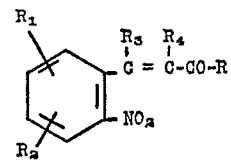

wherein R is alkyl from 1 to 10 carbon atoms, phenyl or tolyl; $R_1$ and $R_2$ independently are hydrogen, lower alkyl, lower alkoxy, phenyl, halogen or, taken tobether on adjacent carbon atoms, —CH=CH—CH=CH—; and $R_3$ and $R_4$ independently are hydrogen, lower alkyl, phenyl or, when taken together, —CH=CH—CH=CH—; with carbon monoxide in the presence of a catalyst consisting essentially of a noble metal and a Lewis acid.

2. The process of claim 1 wherein the noble metal is palladium or rhodium and the Lewis acid is an iron halide.

3. The process of claim 1 wherein the noble metal is palladium and the Lewis acid is ferric chloride.

4. The process of claim 1 wherein the temperature is at least 150° C. but below the decomposition temperature of said nitro compound.

5. The process of claim 1 wherein the reaction is carried out in the presence of a solvent for said nitro compound.

6. The process of claim 5 wherein the solvent is ethanol.

7. The process of claim 5 wherein the solvent is cyclohexane.

8. The process of claim 5 wherein the solvent is benzene.

9. The process of claim 5 wherein the solvent is acetonitrile.

References Cited

UNITED STATES PATENTS

| 3,381,006 | 4/1968 | Suh | 260—326.16 |
| 3,463,781 | 8/1969 | Bell et al. | 260—283 X |
| 3,509,163 | 4/1970 | Brandstrom et al. | 260—326.16 |

FOREIGN PATENTS

| 744,765 | 2/1956 | Great Britain | 260—326.16 |
| 1,184,242 | 3/1970 | Great Britain | 260—283 |

DONALD G. DAUS, Primary Examiner

U.S. Cl. X.R.

260—289 R, 326.16, 429 R, 544 M, 590, 599